UNITED STATES PATENT OFFICE.

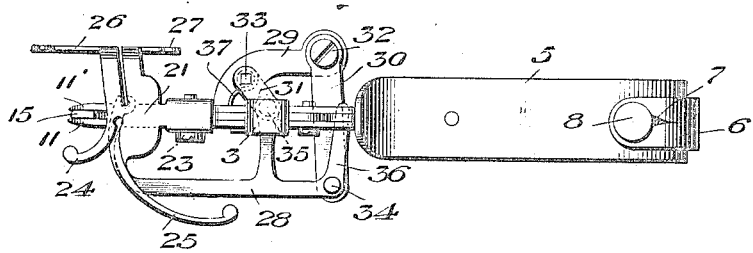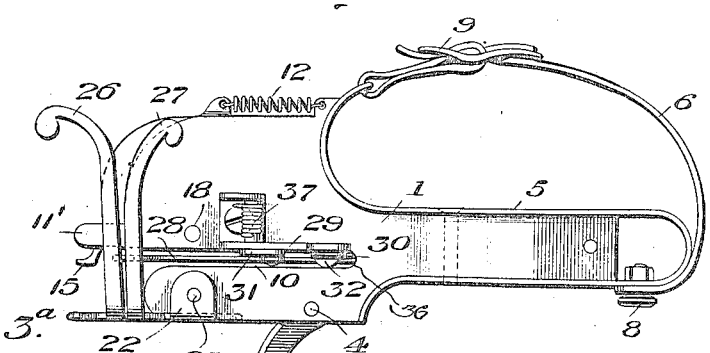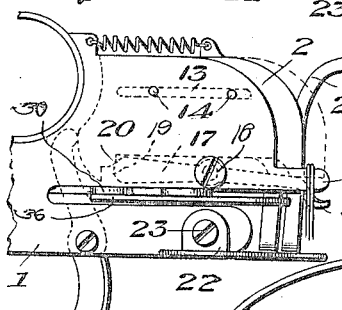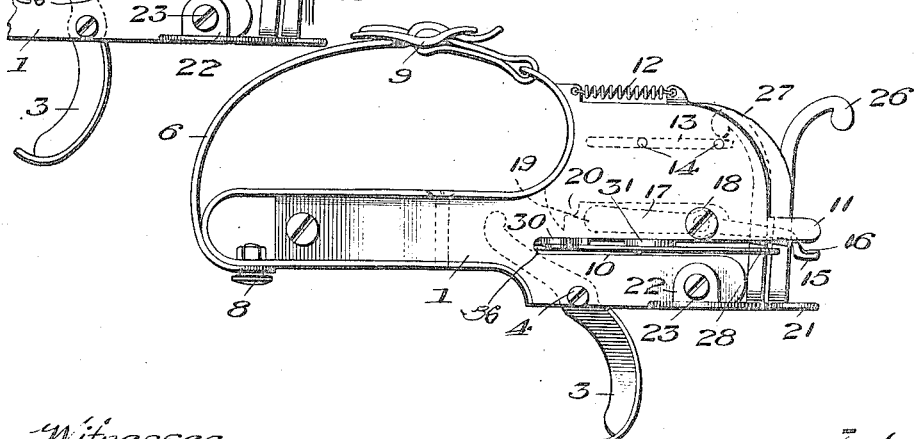

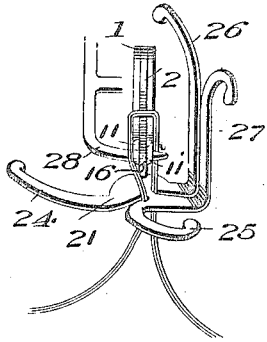
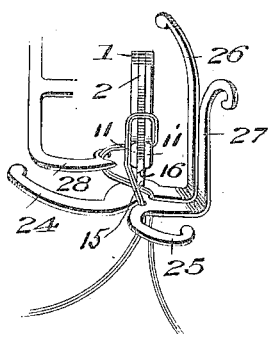
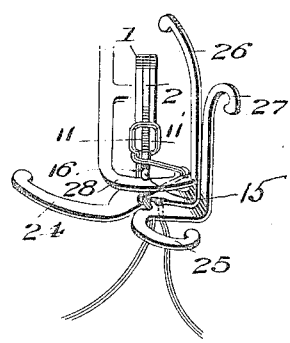
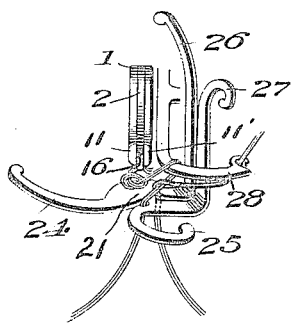
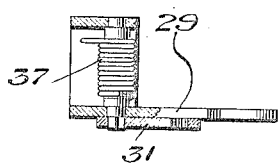
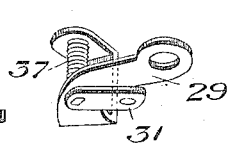
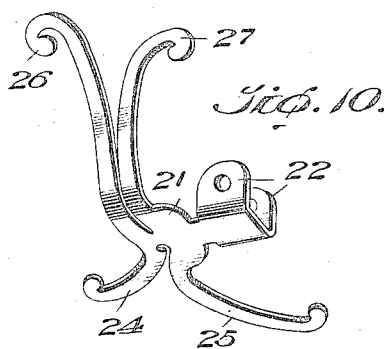
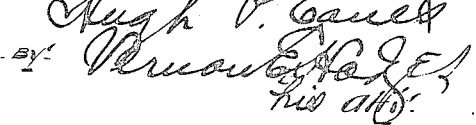

HUGH P. EANES, OF RIDGEWAY, VIRGINIA, ASSIGNOR TO AUTOMATIC MACHINE COMPANY, INC., OF RIDGEWAY, VIRGINIA, A CORPORATION OF VIRGINIA.

THREAD-KNOTTER.

1,390,103.     Specification of Letters Patent.     Patented Sept. 6, 1921.

Application filed March 22, 1919. Serial No. 284,331.

*To all whom it may concern:*

Be it known that I, HUGH P. EANES, a citizen of the United States, residing at Ridgeway, in the county of Henry and State of Virginia, have invented certain new and useful Improvements in Thread-Knotters, of which the following is a specification.

My invention relates to an improvement in thread knotters.

The object is speed of accomplishment, facility, and accuracy in tying the ends of two threads together, the device being used in mills where the contents of several spools are being wound upon a large spool or bobbin, and the attendant takes the two ends and loops them through the thread-guides and around the tying-bill of this device and pulls a trigger and the ends are tied or knotted.

In the accompanying drawings:

Figure 1 is a front view;

Fig. 2 is a view from one side;

Fig. 3 is a view from the opposite side with the internal mechanism indicated in dotted lines;

Fig. 3ª is a view similar to Fig. 3, but showing the parts slightly moved from normal;

Figs. 4, 5, 6 and 7 are views in end perspective showing different stages of the operation;

Figs. 8, 9 and 10 are details, the first in section and the other two in perspective.

The numeral 1 represents the frame of the knotter, preferably comprising two plates held apart and paralleled by suitable spacers (not shown) a distance about the equivalent of the thickness of one of the plates forming the frame to receive therebetween certain operative parts of the device such, for instance, as the stripper 2, which is slidably mounted, and the trigger 3 which is pivotally held by the screw or pin 4.

The rear end of the frame is surrounded by a narrow strip of metal which forms a handle 5, and a strap 6 has a loop 7 at the end by which it is fastened to the button 8 on the handle, after being passed around back of the fingers just in front of the wearer's knuckles. A buckle 9 adjusts the size of the loop thus formed to the size of the operator's hand.

The frame is provided at the forward end with a slot 10, which extends some distance in from the forward edge, dividing the forward end into a pair of jaws.

Integral with the frame and forming parallel projections at the forward end thereof, are the two slightly separated parts 11 and 11' which together constitute the tying-bill of the thread-knotter, which latter is an important part of this invention.

The stripper 2 slides back and forth between these parts of the tying-bill, it being normally held back by a spring 12 and provided with an elongated slot 13 through which the pins 14 extend, and which confines the movement of the stripper to a straight, rectilinear reciprocation.

The rear end of the stripper is in the path of the inner end of the trigger, as indicated in dotted lines in Figs. 3 and 3ª, by means of which the stripper is moved forward against the action of the spring 12 when the knot is to be stripped from the tying-bill.

A cutting-hook 15 normally depends slightly below the tying-bill, it being adapted to receive the threads between its upper edge and the tying-bill, its upper edge 16 being sharpened as is also the lower edge of the part 11' of the tying-bill to form shears to cut the thread when the hook 15 is raised to a point between the parts of the tying-bill, as shown for instance in Fig. 7. This hook 15 is an extension of a lever 17, shown in dotted lines in Figs. 3, and 3ª. This lever 17 is fulcrumed on the frame by means of a screw or pin 18, and its rear end 19 is rounded and in position to be struck by the rounded cam 20 on the lower end of the stripper, as shown in Figs. 3 and 3ª, Fig. 3ª showing the position just as the cam 20 is about to engage the rounded end 19 of the lever 17 and force the hook 15 between the parts of the tying-bill.

The numeral 21 represents a thread-guide. This is shown in perspective in Fig. 10. It is preferably made of a single piece of sheet-metal and provided with a pair of ears 22, which embrace the lower jaw of the frame, and through which a rivet or screw 23 passes to secure the guide rigidly in place. This guide has two pairs of fingers indicated by the numerals 24 and 25, and 26 and 27, which curve outwardly and are rounded at their ends, as shown, to facilitate guiding the threads therebetween.

The numeral 28 represents the tying-hook.

An arm 29 extends out laterally as a rigid part of the frame at a point opposite and adjacent to the slot 10 between the two jaws. The tying-hook 28 is pivotally connected to this arm 29 by means of a long link 30 and a short link 31, which latter are pivoted to the arm by means of the screws or pins 32 and 33 respectively, and the hook is pivoted to these two links by means of pins 34 and 35, respectively. The hook is provided with a lever 36 which is preferably an integral part thereof and extends inwardly, as do the links 30 and 31, or to the slot 10, as shown in Fig. 1, intersecting the direct path of the upper end of the trigger 3, as shown in Figs. 3 and 3ª. The lever 36 always extends inwardly a little closer to the trigger than the link 30 when the parts are in their normal position, for a reason that will be explained. A spring 37 coiled around the pivot 33, in coöperation with the spring 12, restores these parts to their normal position when pressure on the trigger 3 is released.

The tying-hook 28 is open as shown in Figs. 4 to 7 on the side toward the fingers 26 and 27.

In operating my improved knotter, the parts are first in the position shown in Figs. 2 and 4. The knotter is strapped around the fingers of the operator's left hand, it being held with the front end toward the operator, as shown in Figs. 4 to 7. All the operator has to do is to take the two ends of the thread, carry them up between the two fingers 24 and 25, as shown in Fig. 4, over the top of the parts 11, 11' of the tying-bill against the forward end of the stripper 2, thence the operator passes the two threads between the diverging ends of the guide-fingers 26 and 27, and directly down, which movement guides them into the tying-hook 28, all of which is shown in Fig. 4. Now the operator pulls the trigger back with the thumb as far as it will go, and the knot is tied. The first action of the trigger is to engage and push forward the lever 36. This causes the outer end of the tying-hook 28 to swing beneath the tying-bill from one side to the other, as shown in Fig. 5, pulling the threads back of the two upwardly-extending strands. The tying-hook 28 first swings on the pivot 34 alone, but as the trigger continues to move, it strikes the long link 30, the immediate effect of which is to move the tying-hook 28 with its pivots forward toward the outer end of the tying-bill, with the pivot 34 traveling in a large arc, of which the pivot 32 of the link 30 is the center, and the pivot 35 in a smaller but similar arc, of which the pivot 33 of the short link 31 is the center.

The effect of this is to carry the threads held by the hook from a point where they were drawn back of the strands to the left, as shown in Fig. 5, around in front of them and between the cutting-hook 15 and the tying-bill, as shown in Fig. 6, where the thread is caught with the further movement of the trigger striking the inner or rounded end the of stripper 2, as shown in Fig. 3ª, whereupon the stripper is forced forward and the cam 20 by striking the rounded end 19 of the lever 17 causes the hook 15 to draw the threads in between the tying-bill and to cut and hold the same, as shown in Figs. 6 and 7, the neck of the tying-hook drawing the threads to one side and tightening the end as the stripper 2 reaches its outmost stroke, thus completing the knot in the ends to the left, as shown in Fig. 7, the two other ends to the right being severed and thrown away.

Thus it will be seen that the cutting of the thread, the drawing to one side as shown in Fig. 7 around the neck of the hook 28, and the stripping from the tying-bill is all done simultaneously at the conclusion of the backward movement of the trigger.

I claim:

1. A thread-knotter comprising a fixed tying-bill, an edge of which forms a cutter, a hook having a cutting edge which coöperates therewith, and a stripper for removing the knot from the tying-bill and actuating said hook to cause the tying-bill and hook to cut a thread extending therebetween.

2. A thread-knotter comprising a fixed tying-bill, a hook, the two having cutting edges which coöperate to cut the threads extending therebetween, means for forming a loop around the bill and between the hook and bill, a stripper for forcing the loop from the tying-bill, means for actuating the stripper, and means for operating the hook.

3. A thread-knotter comprising a tying-bill, a hook coöperating therewith to catch, hold and cut the threads therebetween, a tying-hook in position to receive the threads, and means for causing said tying-hook to carry one portion of the threads around the other portion and across the space between the tying-bill and its coöperating hook preliminary to its being cut and held, and means for causing the loop formed to be stripped from the tying-bill to complete the knot.

4. A thread-knotter comprising a frame made of two plates spaced apart and having extensions at one end forming a tying-bill, a lever pivoted therebetween and having a hook which coöperates with the tying-bill to form cutters, guide-fingers, a tying-hook which receives the threads, means for moving said tying-hook from one side of the tying-bill to the other and between the tying-bill and the cutting-hook to form a loop, and means for stripping the loop from the tying-bill to form a knot.

5. In a thread-knotter, the combination with a frame, a tying-bill, and a stripper, of a cutting-hook coöperating with the tying-bill and stripper, a tying hook which receives a portion of the threads on one side of the tying-bill, means for moving said tying-hook to the opposite side of the tying-bill, and causing it to carry said portion around from one side of the tying-bill to the other to form a loop, and between the tying-bill and the cutting-hook, and thence causing the stripper to force the loop from the tying-bill to complete the knot.

6. In a thread-knotter, the combination with a frame comprising two plates, a tying-bill around which the threads to be knotted are passed, a cutting-hook pivoted between said plates and coöperating therewith, and a stripper, of a tying-hook, guide-fingers for guiding the threads into said tying-hook at a point adjacent to the tying-bill, means for actuating said tying-hook, stripper and cutting hook at timed intervals, the tying-hook continuously, then the stripper, and finally all three simultaneously, whereby to cause the tying-hook to move from its normal position on one side of the tying-bill to the other, and thence toward its original position to carry one portion of the threads between the cutting-hook and tying-bill to form a loop, and finally drawing said portion past its original position while the cutting and the stripping of the loop formed around the tying-bill simultaneously takes place.

7. In a thread-knotter, the combination with a frame having a tying-bill comprising two parts, one of which has a cutting edge, a cutting-hook pivoted between the parts of the tying-bill, a stripper slidable between said parts of the bill, thread-guiding fingers, a tying-hook, a long and short link pivotally connecting the tying-hook to the frame, whereby the tying-hook swings in two arcs to cause it to move from one side of the tying-bill to the other and back, the tying-bill having a lever on one end adjacent to the long link and projecting inward somewhat beyond the latter, and a trigger pivoted to the frame and moving in the path of the lever of the tying-hook and the long link and of the stripper, the parts so arranged that the lever of the tying-hook is first engaged by the trigger, then by the long link, and finally by the stripper, and a part of the cutting-hook in the path of the stripper is engaged and forced aside by the latter, whereby a portion of the threads which is carried past the tying-bill and into the tying-hook and across and around another portion of said threads to form a loop, is severed to form a knot, which is stripped from the tying-bill at a predetermined time in the operation of the device.

8. In a thread-knotter, the combination with a frame comprising two plates spaced apart and secured parallel with each other, and having a slot through one end dividing the frame into two jaws, a long and short link pivoted to an arm of the frame, one of which links extends toward and the other through the slot, a tying-hook pivoted to said links, said tying-hook having a lever on one end which normally extends inwardly somewhat beyond the long link, the main frame provided with a tying-bill, a cutting-hook pivoted therebetween, a stripper slidable between the plates of the main frame, and having a cam in position to engage an end of the cutting hook to actuate the latter at the moment the stripper approaches the extreme end of the tying-bill, and a trigger which first engages the lever on the tying-hook, then the long link, and finally the stripper, whereby to actuate the tying-hook and stripper together during their simultaneous forward movement, and then actuating the tying-hook, stripper and cutting-hook simultaneously, whereby the knot is formed and removed from the tying-bill.

9. In a thread knotter, a tying-hook, a fixed tying-bill, and guides through which the threads are passed by the operator and guided around the tying-bill and into the tying-hook to form a loop, a cutting-hook for severing the threads, a stripper for removing the loop at a predetermined time to form the knot, and a single means to be moved by the operator for actuating said tying-hook, cutting-hook and stripper at predetermined intervals.

10. In a thread-knotter, a tying-hook pivotally supported at two points, a tying-bill, and guides through which the threads are passed by the operator around the tying-bill and into the tying-hook to form a loop, a cutting-hook for severing the thread, a stripper for removing the loop at a predetermined time to form the knot, and a single means to be moved by the operator for actuating said tying-hook, cutting-hook and stripper at predetermined intervals.

In testimony whereof I affix my signature.

HUGH P. EANES.